Aug. 29, 1944.    B. L. MILLS    2,356,942
DUAL WHEEL MOUNTING
Filed March 26, 1943
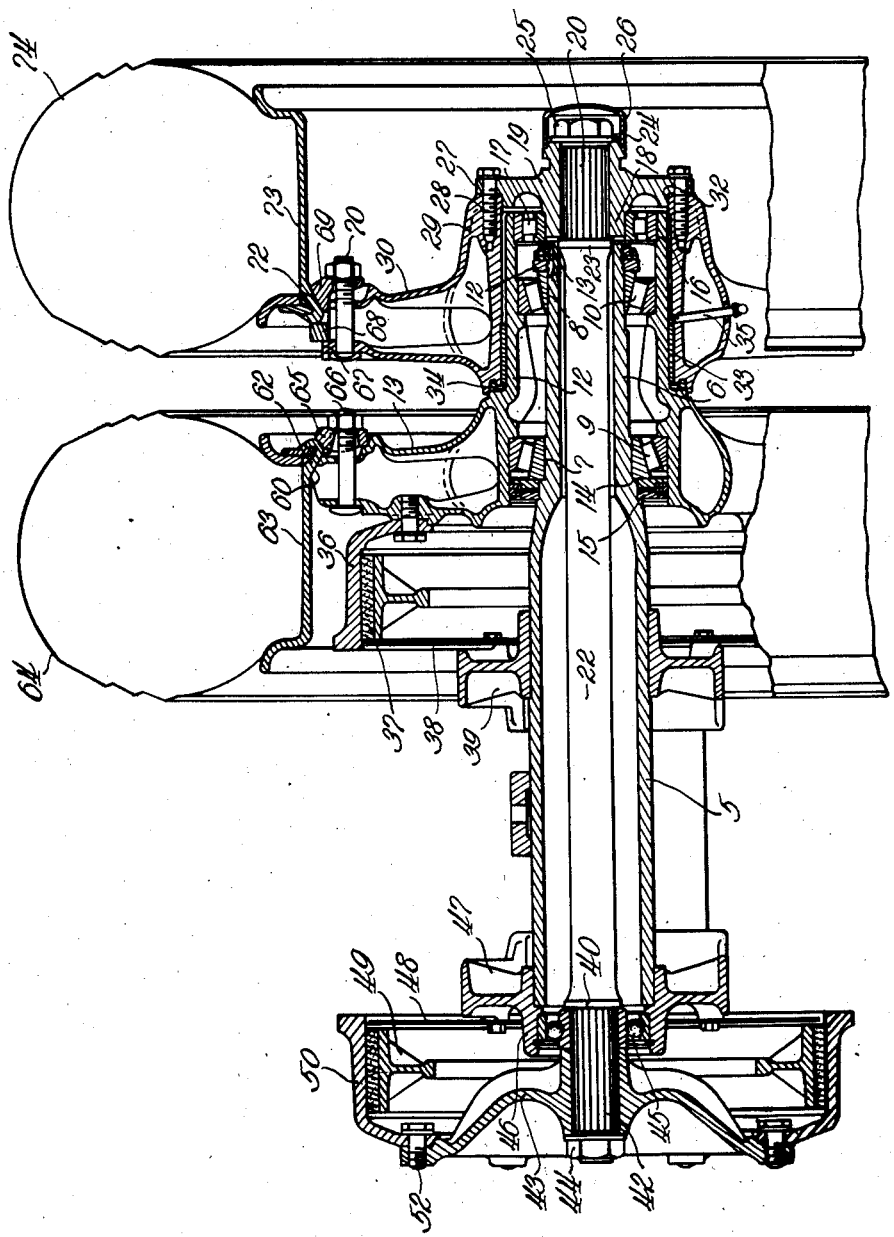
Inventors:
Burton L. Mills
By Walter E. Schirmer
Atty.

UNITED STATES PATENT OFFICE 2,356,942

DUAL WHEEL MOUNTING

Burton L. Mills, Buchanan, Mich., assignor to Clark Equipment Company, Buchanan, Mich., a Corporation of Michigan Application March 26, 1943, Serial No. 480,715

10 Claims. (Cl. 301—36)

This invention relates to a dual wheel mounting, and is more particularly concerned with a dual wheel mounting for independently rotatable dual wheels for a trailer axle of the type shown in United States patent to Mills, No. 2,266,565, issued December 16, 1941, in which each of the wheels is mounted for independent rotation about a tubular spindle with the two spindles on opposite sides of the vehicle rigidly connected together by means of parallel spaced cross members.

The present invention has for its primary object an improved type of bearing arrangement for supporting the wheels for independent rotation, the bearing arrangement being such that the loads are substantially equally distributed on the wheel spindle in order to insure proper loading of the bearings and proper distribution of the load so that substantially uniform even wear is obtained.

In previous constructions of the so-called "independently rotatable dual wheel type," it has been the practice to mount one of the wheels so that the loading thereon is transmitted to the other wheel, whereby one of the wheels carries the major portion of the load, and consequently one of the spaced bearings which supports the load is unduly overloaded. The present invention, while it provides a first wheel having an extended hub upon which the second wheel is mounted, also embodies a bearing arrangement to prevent the load of the second wheel from being transmitted unequally to the bearings for the first wheel, but provides for proper distribution of this load throughout a pair of tapered roller bearings so that both bearings are loaded substantially equally at all times.

Other objects and advantages of the present invention will appear more fully from the following detailed description, which, taken in conjunction with the accompanying drawing, will disclose to those skilled in the art the particular construction and operation of the preferred form of the present invention.

The single figure of the drawing is a sectional view taken through one half of an axle construction embodying the present invention.

Referring now in more detail to the drawing, there is provided a tubular spindle member 5 which has a reduced and thickened extending end 6 which is provided with bearing seats 7 and 8, respectively. The seats 7 and 8 are adapted to receive the tapered roller bearing assemblies 9 and 10, respectively, the bearing assembly 10 being held in position by means of the retainer 12 and the nut 13 threaded over the end of the spindle. The bearing 9 is held in position on its seat against axial movement in one direction by the shoulder 14, and a suitable lubricant seal 15 is provided for preventing escape of lubricant axially inwardly of the bearing 9.

The outer races of the bearings 9 and 10 are suitably received in seats formed in the hub portion 12 of a wheel spider 13 of the hollow spoke type. The hub 12 of this spider is provided with bearing seats as shown for retaining the outer races of the bearings 9 and 10, and is also provided with an axially extended portion projecting beyond the end of the spindle 5 and recessed to form a seat 16 receiving a plain roller bearing assembly 17. The roller bearing assembly 17 has its inner race supported on the flange portion 18 of the member 19, which member 19 is internally splined to fit on the splined portion 20 of an axle shaft 22. The member 19 is retained against the shoulder 23 on the shaft by means of the lock washer 24 and nut 25 threaded over the end of the shaft, the entire nut and washer assembly being enclosed by a cap member 26 threaded over the extending end or hub portion of the member 19.

The member 19 is provided with a peripheral flange portion 27 adapted to receive a peripheral series of studs 28 which bolt the member 19 rigidly to the hub portion 29 of a second wheel spider 30. The wheel spider 30 is mounted on a pilot shoulder 32 of the member 19, and is rigidly secured thereto by means of the studs. The hub portion 29 of the spider 30 is of a diameter closely fitting about the extended hub portion 12 of the spider 13, and preferably a suitable bronze or similar type bushing 33 is provided for service as a lubricant stop, and also as an aligning feature centering the hub 29 about the extended hub portion of the spider 13. A suitable lubricant seal 34 is interposed between the adjacent portions of the spiders 13 and 30 beyond the bushing 33.

It will be apparent that the bearings 17, 10 and 9 can be adequately lubricated by means of the lubricant fitting 35 extending out intermediate two of the spokes of the spider 30, whereby lubricant can be forced into the space between the extended hub portion 12 and the internal surface of the hub 29 and thence through the bearings 17 and through the bearings 10 and 9.

Securely bolted to the inner face of the spider 13 is a brake drum 36 which is adapted to be engaged by suitable brake shoes 37 carried by a backing plate 38 mounted upon a transverse web member 39 welded or otherwise suitably secured to the spindle 5.

The shaft 22 at the end opposite the splined end 20 is provided with the annular shoulder 40 and with a second splined portion 42 adapted to receive a spider 43 which is splined thereon and secured in fixed position by means of the nut 44. Preferably, a suitable ball bearing assembly 45 mounts the inner end of the shaft adjacent the spider 42 upon an extending hub portion 46 of a second transverse web member 47. The web member 47 provides a support for a backing plate 48 carrying the brakeshoes 49, which have operative engagement with the brake drum 50 secured to the spider 43 by means of the studs 52. Thus, it will be apparent that independent brakes are provided for each of the spiders 13 and 40, the spider 13 being controlled by the brake drum 36 and brakeshoes 37, while the spider 30 is controlled through the shaft 22 by means of the brake drum 50 and brakeshoes 49.

Referring now in detail to the inboard wheel 13, the radially extending spokes of this spider are provided with a beveled surface 60 adapted to receive the corresponding beveled edge 62 of a rim 63 upon which the inboard tire 64 is mounted. The beveled edge 62 of the rim is pressed into engagement on the seat 60 by means of lugs 65 carried by the studs 66. This particular mounting forms no part of the present invention, and therefore, it is not believed necessary to describe the same in detail.

The outboard spider 30 has the radially extending spoke ends thereof provided at their inboard sides with the radial shoulder 67 against which is seated a ring member 68, which preferably is a split ring pressed over the ends of the spokes up against the shoulder 67. A suitable rim locking lug 69 is carried by the studs 70, and engages the beveled edge 72 of a rim member 73 upon which the outboard tire 74 is mounted. This construction also is more or less conventional, and no detailed description is believed necessary. Suffice it to say that by this arrangement, the rims 63 and 73 are firmly locked in position on the spoke ends, but can be readily dismounted therefrom if it is necessary to change tires.

One of the particular features of the present invention is the provision of means whereby the load upon the tire 74 is transmitted through the spider 30 and the hub portion 29 thereof to the member 19 supported by the bearings 17 in the end of the extended portion 12 of the spider 13. This is a straight radial load which is transferred by the bearing 17 as a reaction to the load applied to the bearings 9 and 10 through the extended hub portion 12 of the spider 13. Consequently, the major portion of the load on tire 74 comes through the member 19, and thence through the bearing 17 to the end of the hub portion 12, and consequently is transmitted directly to the bearing 10. At the same time, the load from the tire 64 is transmitted through the spider 13 to the bearing 9 so that each of the bearings 9 and 10 supports approximately the loads on each of the wheels 64 and 74, respectively. By reason of this construction, neither of the bearings is unduly overloaded, and the transfer of stresses through the bearing arrangement disclosed provides a novel and expedient way of transmitting loads on the wheels to the axle spindle.

The bushing 33, as previously described, is mainly for purposes of alinement, and practically no load is transmitted therethrough during normal operation of the axle.

It is therefore believed apparent that I have provided a novel type of dual wheel mounting arrangement with improved bearing means for transmitting the load to the axle spindle. However, I do not intend to be limited to the exact details of the embodiment of the invention herein illustrated, but only insofar as defined by the scope and spirit of the appended claims.

I claim:

1. In combination, a tubular axle spindle having a reduced end, axially spaced tapered bearings mounted on said end, a shaft extending through said spindle having a flange collar secured to the end thereof externally of said spindle, a first wheel spider having an elongated hub portion mounted on said bearings and having the end thereof extending beyond said spindle, a bearing interposed between said extended end and said flange collar, a second spider mounted for independent rotation about said extended hub portion, and means rigidly securing said flange collar to the hub of said second spider.

2. The combination of claim 1 wherein one of said tapered bearings is located substantially in the mid-plane of said first spider, and the other tapered bearing is located substantially in the mid-plane of said second spider.

3. In an independently rotatable dual wheel assembly, a first wheel spider having an integral axially outwardly extended hub portion, a second wheel spider having its hub portion encircling and rotatably supported on said extended hub portion, axially spaced bearing means within said extended hub portion substantially in line with said spiders, and bearing means within the outer end of said extended hub portion for transmitting the load of said second spider thereto.

4. The assembly of claim 3 wherein said axially spaced bearing means comprises opposed tapered bearings and said last-named bearing means comprises a straight roller bearing.

5. In combination, a shaft provided at its end with a flange having a hub portion on the inner face thereof forming an annular bearing seat, a tubular spindle encircling said shaft out of contact therewith and terminating short of said hub portion, a wheel spider bolted to said flange, a second wheel spider having an axially extended hub portion encircling said spindle and extending to a point adjacent said flange within the hub of said first spider, bearing means on said seat and seating in the end of said extended hub portion, and axially spaced bearing means mounting said extended hub portion on said spindle.

6. An independently rotatable dual wheel assembly comprising a tubular axle spindle having a shaft extending therethrough, a first wheel rotatably mounted on said spindle and having an extended hub portion, a second wheel having a hub portion encircling said extended hub portion, means on said shaft coupling said second wheel thereto, and means for transferring the load of said second wheel through said coupling means to said extended hub portion.

7. In an independently rotatable dual wheel assembly, a tubular axle spindle, a first wheel spider having an axially extended hub portion extending beyond the end of said spindle, a second wheel spider having its hub portion encircling and rotatably supported on said extended hub portion, axially spaced bearing means between said spindle and said extended hub portion, bearing means in the end of said extended hub portion beyond the end of said spindle, and means for transferring the load of said second spider to said lastnamed bearing means.

8. The assembly of claim 7 wherein said load transferring means includes a flanged collar secured to said second spider hub portion and having a portion engaging in said last-named bearing means.

9. In combination, a tubular axle spindle, axially spaced bearings thereon, a wheel spider having an axially extended hub portion rotatably supported on said bearings and extending beyond the end of said spindle, a second wheel spider rotatable about the extended hub portion of said first spider, a bearing in the extending end of said extended hub portion, and means for transferring the load of said second spider to said lastnamed bearing.

10. In combination, a tubular axle spindle, axially spaced bearings thereon, a wheel spider having an axially extended hub portion rotatably supported on said bearings and extending beyond the end of said spindle, a second wheel spider rotatable about the extended hub portion of said first spider and bearing means for transferring the load of said second spider to the overhanging end of said extended hub portion.

BURTON L. MILLS.